United States Patent [19]
Treon

[11] Patent Number: 4,799,327
[45] Date of Patent: Jan. 24, 1989

[54] BATTERY POWERED FIBER OPTIC FISH LURE

[76] Inventor: Mark A. Treon, 7085 Eastondale Ave., Long Beach, Calif. 90805

[21] Appl. No.: 82,272

[22] Filed: Aug. 6, 1987

[51] Int. Cl.⁴ ............................................. A01K 85/01
[52] U.S. Cl. .................................................... 43/17.6
[58] Field of Search ................... 43/17.6, 17.5, 42.24, 43/42.25, 42.53

[56] References Cited

U.S. PATENT DOCUMENTS

| | | | |
|---|---|---|---|
| 2,002,135 | 5/1935 | Barton | 43/17.6 |
| 2,709,868 | 6/1955 | Simmons | 43/17.6 |
| 3,828,177 | 8/1974 | Day | 43/17.6 |
| 3,940,868 | 3/1976 | Northcutt | 43/17.6 |
| 4,085,538 | 4/1978 | Jaukowski | 43/17.6 |
| 4,175,348 | 11/1979 | Ray | 43/17.6 |
| 4,347,681 | 9/1982 | Fima | 43/17.6 |
| 4,638,584 | 1/1987 | Lindsay | 43/17.6 |

FOREIGN PATENT DOCUMENTS 759073  9/1980  U.S.S.R. ................. 43/17.6

OTHER PUBLICATIONS

Magazine Advertisement of "Electronic Flashing Fish Lure"–Copy Attached–No Date.

Primary Examiner—Nicholas P. Godici
Assistant Examiner—Carmine Cuda
Attorney, Agent, or Firm—William H. Maxwell

[57] ABSTRACT

An illuminated fish lure having a switched battery powered light source distributing light through separated fiber optic bundles to selected parts of an encapsulating body simulating deep water sea life, preferably a small fish of the luminescent type.

9 Claims, 1 Drawing Sheet

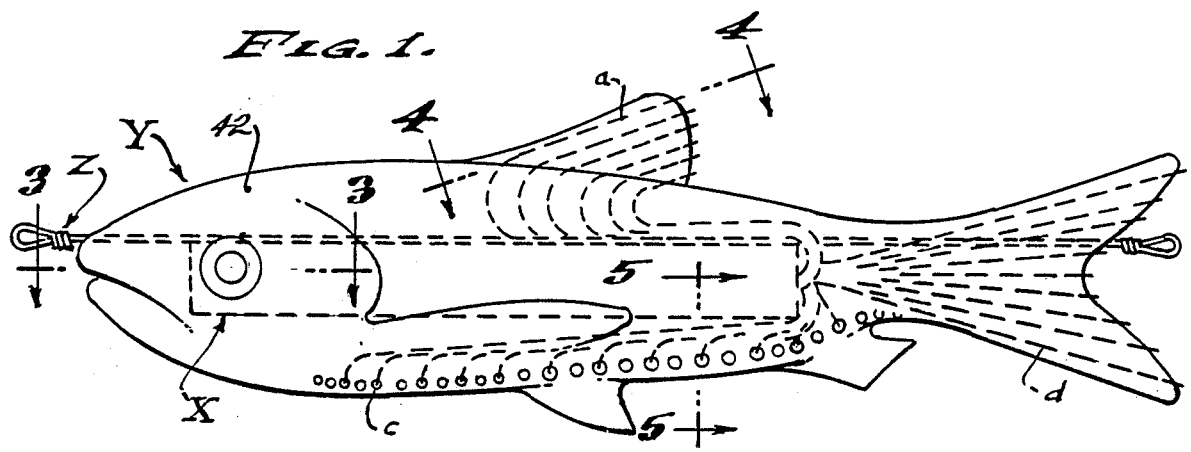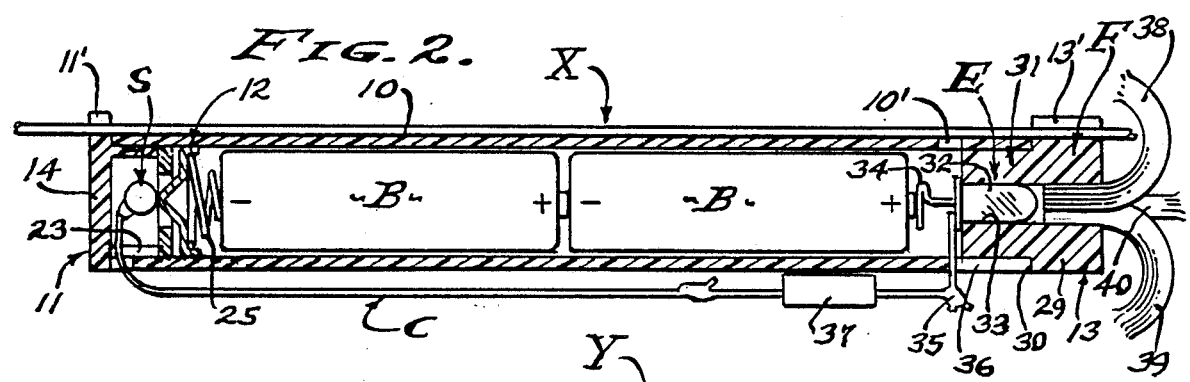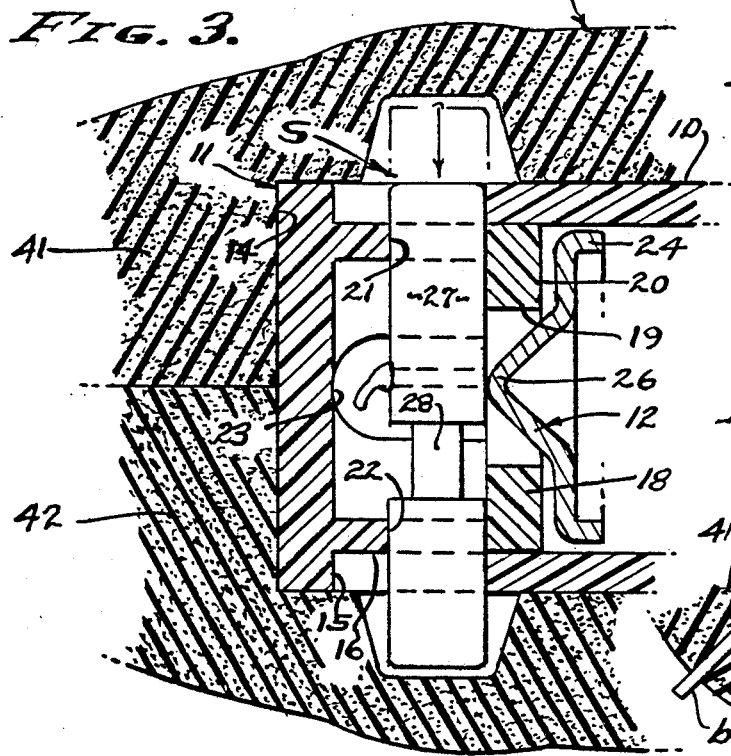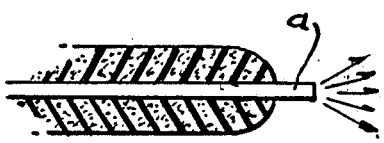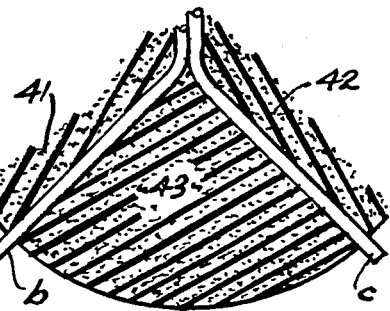

BATTERY POWERED FIBER OPTIC FISH LURE

BACKGROUND OF THE INVENTION

This invention relates to fish lures, it being a general object of this invention to provide a fish lure that simulates benthic luminescent fish, or deep sea and/or bottom fish. It is known that bioluminescence exists among a wide variety of fish, squid, shrimp and some invertabrates. The natural luminescence in sea life is the product of photophores, or light organs, emitting light from the interior of the animal and/or from the exterior thereof. That is, there are indirectly lighted areas of the animal, and there are luminescent spots; all of which may be scattered or in rows anteriorly, posteriorly, or laterally, and occuring in various colors such as yellow, red and green. For the most part the light spots are minute, and light emission is in some instances through a lens and in other instances is through filiform bodies such as occur in the projecting fin structures of the animal; especially ocurring in small fish. With the present invention, various known forms of fish and other sea life are simulated, but not necessarily in an exact representation, since pseudo-form creatures can sometimes be more acceptable as a lure.

It is an object of this invention to advantageously employ fiber optics in the simulation of benthic sea life, shown and described herein as a fish lure. With the present invention light is distributed through optical fibers to various parts of the lure, to emanate therefrom. The areas and points of light emission can vary as required, in order to simulate any certain species of sea life or fish, or to present a pseudo-form of sea life or fish. In this respect, and as hereinabove set forth, for example, a fish may have a coextensive scatter of luminescence, or its luminescence may be in rows of spots or from filiform bodies; anteriorly, posteriorly or laterally.

It is also an object of this invention to provide an electrical light source for a fish lure subject to submersion at great depths. With the present invention the electrical light source is encapsulated so as to be unaffected by the extreme water pressure that it is subjected to.

It is another object of this invention to provide means by which the electrical light source can be activated and deactivated without destroying the aforesaid encapsulation of said light source. With this invention the lure body which encapsulates the electrical light source is of a depressible material, there being a switch operable by depressing opposite portions of the lure body.

It is still another object of this invention to provide a low amperage electrical light source that concentrates light into a bundle of optical fibers, for distribution throughout the lure as may be required. With this invention the power source is a battery and the light source is a light emitting diode that condenses light into the optic fibers.

Finally, it is an object of this invention to correlate the foregoing objectives and their structures in a unit or component module that can be encapsulated in any one of a variety of lure configurations wherein the optical fibers are distributed and terminated as circumstances require.

SUMMARY OF THE INVENTION

The fish lure provided herein is primarily for fishing at great depths where sunlight is substantially or completely reduced, and where bioluminescent sea life normally exists and is preyed upon by the greater fish. It is to be understood that the fishing tackle employed with this lure can vary as required, including leaders and hooks at and along lines with sinkers. This lure is characterized by its body of depressible material that encapsulates an electrical light source and optical fiber light distributing module. A feature of this invention is the distribution of light throughout certain areas and/or rows of light spot that duplicate or resemble those of natural bioluminescent fish, and also pseudo-form fish, all as circumstances require.

The foregoing and various other objects and features of this invention will be apparent and fully understood from the following detailed description of the typical preferred form and application thereof, throughout which description reference is made to the accompanying drawings.

THE DRAWINGS

FIG. 1 is a side view of a typical fish lure embodiment of the present invention.

FIG. 2 is an enlarged sectional view taken as indicated by line 2—2 on FIG. 1, showing the unit or component module that I provide.

FIG. 3 is an enlarged detailed fragmentary view taken as indicated by line 3—3 on FIG. 1 and showing the battery contact and switch.

FIG. 4 is an enlarged detailed fragmentary view taken as indicated by line 4—4 on FIG. 1 and showing emanation of light from an optical fiber.

And, FIG. 5 is an enlarged detailed fragmentary view taken as indicated by line 5—5 on FIG. 1 and showing emanation of light from lateral optical fibers.

PREFERRED EMBODIMENT

Referring now to the drawings, this fish lure involves a light source and distribution module X encapsulated within a body Y through which a leader Z extends. The module X is preferably a unit made up of plastic parts correlating batteries B, a switching means S, a light emitting means E, and a bundle of optical fibers F. A typical arrangement of batteries B, switching means S, emitting means E and optical fibers F is shown. Note that the optical fibers F are flexible and separated so as to be distributed to simulate a known species of sea life, or to create a pseudo-form of sea life. Although a module X is preferred as shown, it is to be understood that the batteries B, switching means S and emitting means E can be an assemble of parts simply soldered together in an assembly with means relating the emitting means E to the opical fibers F for the transmission of light as shown or as may be required.

The light source and distribution module X is shown as an elongated small diameter tube 10 of insulating plastic that carries a pair of batteries B in series to produce three volts. In practice, the batteries are alkaline cells of cylinder form, in a circuit C to the light emitting means E. The switching means S is carried by a front end plug 11 that captures a battery-switch contact 12, and the light emitting means E is carried by a back end plug 13 that relates the light emitting means to the bundle of optical fibers F. It is preferred that parts 10, 11 and 13 are each of molded plastic which is dielectric.

The front end plug 11 has an end wall 14 with its perimeter portion forming a shoulder 15 to engage the front end of the tube 10. A cylinder portion 16 integral with wall 14 enters into the tube 10 to engage and position a disc-shaped partition wall 18 that controls the battery-switch contact 12. The partition wall 18 has a center opening 19 therethrough to pass the battery-switch contact 12, and it has a back wall 20 that limits forward motion of said battery-switch contact. Between the end wall 14 and partition wall 18 there is a switch chamber, the cylinder portion 16 having diametrically opposite notches 21 and 22 to pass the switch member later described. Also, the cylinder portion 16 has a downwardly opening notch 23 to pass the circuit C, notches 21 and 22 being aligned on a transverse horizontal axis. The front end plug 11 is cemented or fused in place as shown.

The battery-switch contact 12 is a disc-shaped part that has a perimeter flange 24 that centers a compression spring 25 that seats thereon and presses against the butt end terminal of the batteries B. A center contact 26 projects forwardly from the contact disc to enter through the center opening 19 through the partition wall 18, to be depressed by the switch contact member 27.

The contact member 27 is a round bar of conductive metal slidable through the notches 21 and 22, and longer than the diameter of the tube 10, so that it will project from either side thereof. As shown in FIG. 3, the contact member 27 has a reduced portion 28 intermediate its end and which is offset in the position shown to permit contact, and alternately to prevent contact when shifted to the phantom line position shown. The contact member 27 is manually shiftable into OFF and ON positions by depressing it from opposite ends.

The back end plug 13 has an end wall 29 with its perimeter portion forming a shoulder 30 to engage the back end of the tube 10. A cylinder portion 31 integral with wall 29 enters into the tube 10 to carry the light emitting means E, preferably in the form of a light emitting diode or LED 32.

The light emitting diode or LED 32 enters rearwardly into a bore 33 through the plug 13, the LED being shouldered to stop in working position. The positive lead 34 of the LED is formed so as to engage the positive center terminal of the batteries B, and the negative lead 35 depends through a notch 36 at the bottom of the tube 10. The LED 32 is seated by pressure applied by spring 25, through the batteries B. The diode LED 32 can be selected for its color and it can be continuously illuminated or it can be of the intermittant flasher type, as desired.

The leader Z is carried contiguous to the upper side of tube 10 and positioned there by guides 11' and 13', the leader being a straight wire or the like to act under tension along the plane of bilateral symmetry of the lure. As shown, the leader Z extends from the front to the back of the lure, and at each end it is formed with a loop or the like for securement to a hook or line.

The circuit C is a series circuit from contact member 27 to the lead 35, there being a resister 37 therein to limit current flow and thereby conserve battery life. When a flasher type LED 32 is employed, it will include an integrated circuit with transisters limiting current therethrough, so that no external resister (37) is necessary.

In practice, there are interstices and cavities within the module X from which air is excluded by injecting a space filling fluid through and opening 10', a nonconductive fluid; whereby collapse and/or deformation will not occur under extreme outside pressure.

In accordance with this invention, the bundle of optical fibers F is provided to distribute light emitted from the LED 32 and to transmit it to the various areas and spots or rows of spots to be illuminated. The bundle of optical fibers F is entered into the bore 33 to oppose the lens end of LED 32, and the bundle is separated into smaller bundles and each having the number of light transmitting fibers to illuminate the area and/or spots required. As shown, there are three separated bundles 38, 39 and 40, as follows: bundle 38 turned upward and forward to the dorsal area of the fish lure; bundle 39 turned downward and forward to the ventral area of the fish lure; and bundle 40 extended rearward to the tail area of the fish lure.

Bundle 38 to the dorsal area contains a determined number of optical fibers which are turned upwardly in the plane of bilateral symmetry and then rearwardly, as shown. For example, six such filiment or fibers a, as shown.

Bundle 39 to the ventral area contains a determined number of optical fibers which are turned downwardly in the plane of bilateral symmetry and from the plane so as to extend laterally and alternately to opposite sides of the fish lure. These are referred to as ventro-lateral filiments or fibers b and c, there being twelve such fibers extending to each side of the fish lure, as shown.

Bundle 40 to the tail area contains a determined number of optical fibers fanned out in the plane of bilateral symmetry, there being nine such filiments or fibers d, as shown.

As shown is FIG. 4 of the drawings, each optical fiber a projects as a stub from the dorsal fin of the fish lure. The same is true of the fibers d projecting from the tail as is indicated.

As shown in FIG. 5 of the drawings, each optical fiber b and c projects as a stub from the ventro-lateral area of the fish lure.

Referring now to encapsulation of the above described module X and leader Z, the body Y is made in two halves 41 and 42 that join at the plane of bilateral symmetry, and it is at this plane that they are permanently secured together as by cementing or by fusion. The halves 41 and 42 are solid with cavities to accomodate the module X are the alternate projection of switch member 27 therefrom, and also to guide the optical fibers a - d before securing the body halves together. When ventro-lateral fibers are employed, a ventral keel member 43 separates fibers b and c, member 43 being cemented or fused to the two body halves 41 and 42 along diagonal planes as shown in FIG. 5. The body members 41, 42 and 43 are formed of a manually depressible plastic, whereby the eye area, for example, of the fish lure is aligned with the axis of switch member 27 so that it can be pressed from alternate sides of the fish lure to operate as hereinabove described.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. An illuminated fish lure in the form of sea life and the like, and including;
  a light source module having an electric battery, a light emitting means and a manipulatable ON and OFF switching means in series circuit through the battery and light emitting means.
  a body in the form of said sea life and of depressible material encapsulating the light source module and with depressible sides, overlying said switching means for alternately opposite manipulaton of said switching means to ON and OFF positions, and the light emitting means being visible from the body, and there being a leader extending from the body.

2. The illuminated fish lure as set forth in claim 1, wherein the switching means includes an alternately positionable ON and OFF switch member manipulatable through opposite depressible sides of the depressible body material encapsulating the same.

3. The illuminated fish lure as set forth in claim 1, wherein the electric battery, light emitting means and switching means are incorporated in a tube and comprise said light source module, wherein a guide on the light source module positions the leader extending from the body and from which said module depends with at least one end of the leader extending from the body, wherein the switching means includes an alternately positionable ON and OFF switch member manipulatable through opposite depressible sides of the depressible body material encapsulating the same.

4. An illuminated fish lure in the form of sea life and the like, and including;
- a light source module having an electric battery, a light emitting means and an ON and OFF switching means in series circuit through the battery and light emitting means,
- a body in the form of said sea life and comprised of two body halves fused together at a vertical and longitudinally disposed plane of joinder and encapsulating the light source module with access to the ON and OFF switching means,
- a bundle of optical fibers emanating from the light emitting means and the optical fibers thereof separated and distributed at the plane of joinder between the body halves and leading to and visible at selected surfaces of the body, and
- there being a leader extending from the body.

5. The illuminated fish lure as set forth in claim 4, wherein the optical fibers are distributed dorsally at the plane of joinder between the two body halves.

6. The illuminated fish lure as set forth in claim 4, wherein the optical fibers are distributed ventrally at the plane of joinder between the two body halves.

7. The illuminated fish lure as set forth in claim 4, wherein the optical fibers are distributed ventro-laterally from the plane of joinder and on diagonal planes of joinder between a keel member and the two body halves.

8. The illuminated fish lure as set forth in claim 4, wherein selected optical fibers are distributed rearwardly at the plane of joinder between the two body halves.

9. The illuminated fish lure as set forth in claim 4, wherein selected optical fibers are distributed dorsally at the plane of joinder between the two body halves, wherein selected optical fibers are distributed rearwardly at the plane of joinder between the two body halves, and wherein selected optical fibers are distributed ventro-laterally from the first mentioned plane of joinder and on diagonal planes of joinder between a keel member and the two body halves

* * * * *